United States Patent
Jeon et al.

(10) Patent No.: US 9,347,154 B2
(45) Date of Patent: *May 24, 2016

(54) DRAWN POLY(ETHYLENE-TEREPHTHALATE) FIBER, POLY(ETHYLENETEREPHTHALATE) TIRE-CORD, THEIR PREPARATION METHOD AND TIRE COMPRISING THE SAME

(75) Inventors: Ok-Hwa Jeon, Gyeongsan-shi (KR); Il Chung, Goomi-shi (KR); Gi-Woong Kim, Daegu (KR)

(73) Assignee: KOLON INDUSTRIES, INC., Kwacheon (KR)

( * ) Notice: Subject to any disclaimer, the term of this patent is extended or adjusted under 35 U.S.C. 154(b) by 913 days.

This patent is subject to a terminal disclaimer.

(21) Appl. No.: 12/663,653

(22) PCT Filed: Jun. 20, 2008

(86) PCT No.: PCT/KR2008/003528
§ 371 (c)(1),
(2), (4) Date: Dec. 8, 2009

(87) PCT Pub. No.: WO2008/156334
PCT Pub. Date: Dec. 24, 2008

(65) Prior Publication Data
US 2010/0154957 A1    Jun. 24, 2010

Related U.S. Application Data

(60) Provisional application No. 61/047,500, filed on Apr. 24, 2008.

(30) Foreign Application Priority Data

Jun. 20, 2007  (KR) .................. 10-2007-0060371
Jun. 20, 2008  (KR) .................. 10-2008-0058214

(51) Int. Cl.
*D02G 3/48*     (2006.01)
*B60C 9/00*     (2006.01)
*D01F 6/62*     (2006.01)

(52) U.S. Cl.
CPC .............. *D02G 3/48* (2013.01); *B60C 9/0042* (2013.04); *D01F 6/62* (2013.01); *D10B 2331/04* (2013.01); *Y10T 428/2913* (2015.01)

(58) Field of Classification Search
CPC .......... B60C 9/0042; D02G 3/48; D01F 6/62; D10B 2331/04; D01D 5/098; Y10T 428/2913
USPC ................................................. 428/364, 902
See application file for complete search history.

(56) References Cited

U.S. PATENT DOCUMENTS 3,946,100 A  *  3/1976  Davis et al. .............. 264/211.15
3,966,867 A     6/1976  Munting (Continued)

FOREIGN PATENT DOCUMENTS

EP         0311386 A2    4/1989
JP         61-019812 A   1/1986

(Continued)

OTHER PUBLICATIONS

Japanese Patent Office, Japanese Office Action issued in corresponding JP Application No. 2010-513125, dated Sep. 25, 2012.
European Patent Office, Communication dated Jan. 13, 2015 in corresponding European application No. 08766487.6.

*Primary Examiner* — Jeremy R Pierce
(74) *Attorney, Agent, or Firm* — Sughrue Mion, PLLC (57) ABSTRACT

The present invention relates to a drawn PET fiber which has good dimensional stability, thereby increases the high speed driving performance of a tire, a PET tire cord, their preparation methods, and a tire including the same. The drawn PET fiber may includes 90 mol % or more of PET and may be a fiber of which a creep rate is 5.5% or less when the drawn PET fiber is fixed under the initial load of 0.01 g/d and is kept for 24 hours under the load of 0.791 g/d and the temperature of 100° C. Furthermore, the PET tire cord may be a cord of which a creep rate is 4.0% or less when the PET tire cord is fixed under the initial load of 0.01 g/d and is kept for 24 hours under the load of 0.791 g/d and the temperature of 100° C.

18 Claims, 2 Drawing Sheets

(56) References Cited

U.S. PATENT DOCUMENTS

| | | | |
|---|---|---|---|
| 4,101,525 A | | 7/1978 | Davis et al. |
| 4,827,999 A | | 5/1989 | Yabuki et al. |
| 5,049,339 A | | 9/1991 | Hrivnak et al. |
| 5,102,603 A | | 4/1992 | Oblath et al. |
| 5,137,670 A | | 8/1992 | Murase et al. |
| 5,388,628 A | * | 2/1995 | Tamura .................. 152/556 |
| 5,472,781 A | * | 12/1995 | Kim et al. .................. 428/364 |
| 5,558,935 A | * | 9/1996 | Tanaka et al. .................. 428/364 |
| 5,894,875 A | * | 4/1999 | Masaki et al. .................. 152/527 |
| 6,764,623 B2 | | 7/2004 | Kim et al. |
| 6,967,058 B2 | | 11/2005 | Park et al. |
| 2001/0039988 A1 | * | 11/2001 | Kim et al. .................. 428/364 |
| 2003/0207111 A1 | | 11/2003 | Nelson et al. |

FOREIGN PATENT DOCUMENTS

| | | |
|---|---|---|
| JP | 62-069819 A | 3/1987 |
| JP | 07-070819 A | 3/1995 |
| JP | 2006-188796 A | 7/2006 |
| JP | 2007-022366 A | 2/2007 |
| JP | 2010-530480 A | 9/2010 |
| KR | 10-2005-0012625 A | 2/2005 |
| KR | 10-2005-0020885 A | 3/2005 |
| KR | 10-0571214 B1 | 4/2006 |
| KR | 10-0602286 B1 | 7/2006 |
| WO | 2008/156333 A1 | 12/2008 |

* cited by examiner

DRAWN POLY(ETHYLENE-TEREPHTHALATE) FIBER, POLY(ETHYLENETEREPHTHALATE) TIRE-CORD, THEIR PREPARATION METHOD AND TIRE COMPRISING THE SAME

CROSS REFERENCE TO RELATED APPLICATION

This application is a National Stage of International Application No. PCT/KR2008/003528 filed Jun. 20, 2008, claiming priority based on Korean Patent Application No. 10-2007-0060371, filed Jun. 20, 2007, U.S. Provisional Application No. 61/047,500 filed Apr. 24, 2008 and Korean Patent Application No. 10-2008-0058214 Jun. 20, 2008, the contents of all of which are incorporated herein by reference in their entirety.

BACKGROUND OF THE INVENTION (a) Field of the Invention

The present invention relates to a drawn polyethylene terephthalate (PET) fiber, a PET tire cord, their preparation methods, and a tire including the same. More particularly, the present invention relates to a drawn PET fiber that has good dimensional stability, thereby increases the high speed driving performance of a tire, a PET tire cord, their preparation methods, and a tire including the same.

(b) Description of the Related Art

Figure 1:
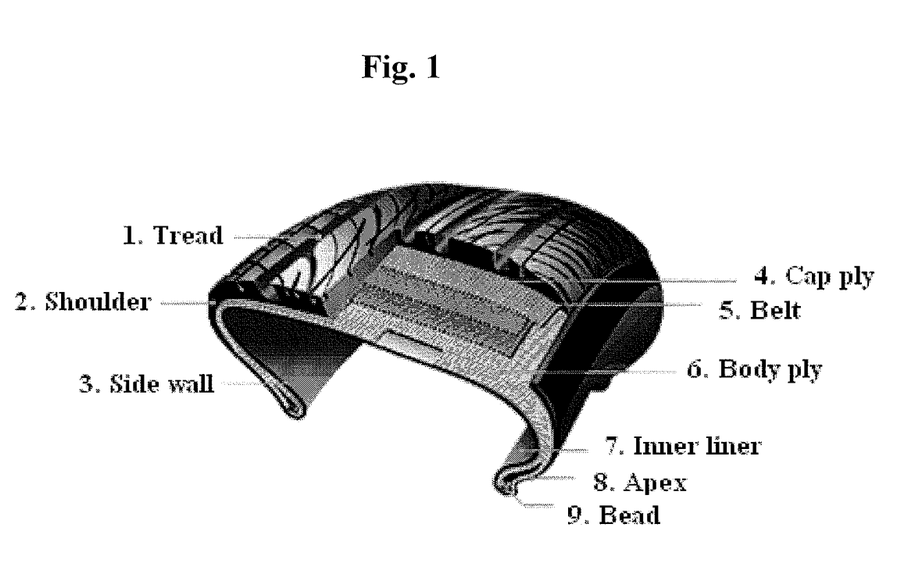
FIG. 1 is a partial cut-away perspective view illustrating a structure of a general tire.

A tire is a complex body of fiber/steel/rubber, and generally has a structure as illustrated in FIG. 1. That is, the steel and fibers cord take a role of reinforcing the rubber and form a basic skeletal structure in the tire. It is, so to speak, like the role of a bone in a human body.

As reinforcement for the tire, the performance factors such as fatigue resistance, shear strength, durability, repelling elasticity, adhesion to a rubber, and the like are required to the cord. Therefore, various cords made of suitable materials are used according to the performances required to the tire.

Recently, rayon, nylon, polyester, steel, aramid, and the like are generally used as the materials for the cord, and the rayon and the polyester are used for a body ply (or a carcass) (6 in FIG. 1), the nylon is mainly used for a cap ply (4 in FIG. 1), and the steel and the aramid are mainly used for a tire-belt part (5 in FIG. 1).

The structure and the characteristics of the tire represented in FIG. 1 are briefly disclosed hereinafter.

Tread 1: A part contacting the road surface; this part must provide a friction force necessary for braking and driving, be good in abrasion resistance, and also be able to stand up against an external shock, and its heat generation must be small.

Body ply (or Carcass) 6: A cord layer inside the tire; this part must support a load and stand against a shock, and its fatigue resistance against bending and stretching movement during driving must be good.

Belt 5: This part is located between the body plies and is mostly composed of steel wire, and it lessens the external shock and also makes the ground contacting surface of the tread wide and the driving stability good.

Side wall 3: A rubber layer between the lower part of the shoulder 2 and the bead 9; it takes a role of protecting the internal body ply 6.

Bead 9: A square or hexagonal wire bundle, wherein a rubber is coated on the steel wires; it takes a role of fitting and fixing the tire to a rim.

Inner liner 7: A part located inside the tire instead of a tube; it makes a pneumatic tire possible by preventing air leakage.

Cap ply 4: A special cord fabric located on the belt of a radial tire for some passenger cars; it minimizes the movement of the belt during driving.

Apex 8: A triangular rubber packing material used for minimizing the dispersion of the bead, protecting the bead by relieving external shock, and preventing an air inflow during shaping.

Recently, developments for tires suitable for high speed driving are required as the passenger cars are gentrified, and accordingly the stability during high speed driving and high durability of the tire are recognized as very important characteristics. Furthermore, the performance of the materials for the cap ply cord importantly comes to the force before everything else for satisfying the characteristics.

The steel belt inside the tire is generally arranged in the oblique direction, however the steel belt tends to move toward the circumferential direction during high speed driving, and there are some problems that the sharp ends of the steel belt may cause separation between the layers of the belt and shape deformation of the tire by cutting the rubber or generating cracks. The cap ply prevents the separation between the layers and deformation of the shape of the tire and takes a role of improving the high speed durability and the driving stability by restraining the movement of the steel belt.

A nylon 66 cord is mainly used for a general cap ply cord. The nylon 66 cord may show the effect of restraining the movement of the belt by exhibiting high shrinkage force at the stiffening temperature of 180□ and wrapping the steel belt, however, it has disadvantages in that partial deformation may be caused by the load of the tire and the car and it may clatter during driving because it has low dimensional stability.

Furthermore, the shape of the nylon 66 cord may be easily deformed and the deformed nylon 66 results in tire deformation when the load given to the nylon 66 cord is changed by a change of the driving speed of the car and the controllability and the riding comport of a car may be decreased accordingly, because the nylon 66 cord has low dimensional (shape) stability.

On the other hand, a general PET fiber or a PET high modulus low shrinkage (HMLS) fiber that is mostly used as an industrial fiber has good dimensional stability in comparison with the nylon 66, but the external shape of the cord composed of the fibers may be easily deformed and may deform the tire when the driving speed of the car is suddenly increased, because the general PET fiber or the PET HMLS fiber does not have sufficient dimensional stability either. Therefore, even in case of using the cord composed of the fibers as the cap ply cord, the high speed driving performance of the tire, the controllability or the riding comport of the car are insufficient.

SUMMARY OF THE INVENTION

An aspect of the present invention is to provide a drawn PET fiber and a PET tire cord which have good dimensional stability, thereby increase the high speed driving performance of a tire.

Another aspect of the present invention is to provide preparing methods of the drawn PET fiber and the tire cord.

Still another aspect of the present invention is to provide a tire including the PET tire cord.

The present invention provides a drawn polyethylene terephthalate (PET) fiber, including 90 mol % or more of PET, wherein a creep rate defined by the following Calculation Formula 1 is 5.5% or less when the drawn PET fiber is fixed under the initial load of 0.01 g/d and is kept for 24 hours under the load of 0.791 g/d and the temperature of 100° C.:

$$\text{Creep rate} = (L-L0)/L0 \times 100 \qquad \text{[Calculation Formula 1]}$$

wherein L is a length of the drawn PET fiber after keeping it for 24 hours, L0 is a length of the drawn PET fiber when it is fixed under the initial load.

The present invention also provides a preparing method of a drawn PET fiber including steps of: melt-spinning a polymer including 90 mol % or more of PET so as to prepare a undrawn PET fiber having crystallinity of 25% or more and an amorphous orientation factor (AOF) of 0.15 or less; and drawing the undrawn PET fiber with a drawing ratio of 1.70 or less so as to prepare the drawn PET fiber.

The present invention also provides a PET tire cord including the drawn PET fiber.

The present invention also provides a PET tire cord, wherein a creep rate defined by the following Calculation Formula 1 is 4.0% or less when the PET tire cord is fixed under the initial load of 0.01 g/d and is kept for 24 hours under the load of 0.791 g/d and the temperature of 100° C.:

$$\text{Creep rate} = (L-L0)/L0 \times 100 \qquad \text{[Calculation Formula 1]}$$

wherein L is a length of the PET tire cord after keeping it for 24 hours, L0 is a length of the PET tire cord when it is fixed under the initial load.

The present invention also provides a preparing method of a PET tire cord, including steps of melt-spinning a polymer including 90 mol % or more of PET so as to prepare a undrawn PET fiber having crystallinity of 25% or more and an amorphous orientation factor (AOF) of 0.15 or less; drawing the undrawn PET fiber with a drawing ratio of 1.70 or less so as to prepare a drawn PET fiber; and twisting the drawn PET fibers and dipping the same in an adhesive.

The present invention also provides a pneumatic tire including the present PET tire cord.

DETAILED DESCRIPTION OF THE PREFERRED EMBODIMENTS

Hereinafter, the drawn PET fiber, the PET tire cord, the preparing methods thereof, and the tire including the same are explained in more detail according to the specific embodiments of the present invention. However, since the embodiments are provided as examples of the present invention, the scope of the right of the present invention is not limited to or by them and it is obvious to a person skilled in the related art that various modifications of the embodiments are possible within the scope of the right of the present invention.

In addition, the term 'include' or 'comprise' means that include any component (or any element) without particular limitations unless otherwise mentioned in the present entire disclosure, and it cannot be interpreted as it excludes the addition of the other components (or elements).

The drawn polyethylene terephthalate (PET) fiber is prepared by melt-spinning the PET so as to prepare the undrawn fiber, and drawing the undrawn fiber, and the PET tire cord, a dip cord type, may be prepared by twisting the PET drawn fibers, and dipping the same into the adhesive.

Therefore, the properties of the undrawn fiber prepared by the melt-spinning of the PET and the drawn fiber prepared by drawing the same are directly or indirectly reflected to the properties of the tire cord.

According to one embodiment of the present invention, the drawn PET fiber having required properties is provided. The drawn PET fiber includes 90 mol % or more of the PET and its creep rate defined by the following Calculation Formula 1 is 5.5% or less when the drawn PET fiber is fixed under the initial load of 0.01 g/d and is kept for 24 hours under the load of 0.791 g/d and the temperature of 100° C.:

$$\text{Creep rate} = (L-L0)/L0 \times 100 \qquad \text{[Calculation Formula 1]}$$

wherein L is a length of the drawn PET fiber after keeping it for 24 hours, L0 is a length of the drawn PET fiber when it is fixed under the initial load.

According to experimental results of the present inventors, the drawn PET fiber is not largely deformed in spite of the change of the load given to the drawn fiber itself and has good dimensional stability. Thus, a tire cord prepared from the drawn PET fiber is not largely deformed even though the load given to the cord is suddenly increased by the change of the driving speed of the car. Therefore, by using the drawn PET fiber according to one embodiment of the present invention, it is possible to provide the tire cord which shows good dimensional stability and strongly fixes the steel belt as a cap ply cord in a tire. It is also possible to increase the high speed driving performance of the tire, the controllability and the riding comport of the car.

Meanwhile, the drawn PET fiber according to one embodiment of the present invention includes 90 mol % or more of PET in order to show the properties suitable for the tire cord. If the drawn PET fiber has the PET with a content of below 90 mol %, the drawn PET fiber and the tire cord prepared therefrom are hard to have the preferable properties intended by the present invention. Hereinafter, therefore, the term "PET" means the PET of which the content is 90 mol % or more unless otherwise explained.

Furthermore, the creep rate of the drawn PET fiber according to one embodiment of the present invention is 5.5% or less, and preferably 5.0% or less. The PET tire cord prepared from this drawn PET fiber can strongly fixes the steel belt as a cap ply cord and show good dimensional stability.

Further, the creep rate after heating the drawn PET fiber for 15 min under the load of 0.01 g/d and the temperature of 180° C. may be 7.5% or less, and preferably 7.0% or less, when the heated drawn PET fiber is fixed under the initial load of 0.01 g/d and is kept for 24 hours under the load of 0.791 g/d and the temperature of 100° C. The PET tire cord prepared from this drawn PET fiber can show good dimensional stability under the high temperature condition corresponding to the high speed driving condition of a tire and increase the high speed driving performance of the tire, the controllability or the riding comport of the car.

Furthermore, the creep rate after heating the drawn PET fiber for 15 min under the load of 0.01 g/d and the temperature of 180° C. may be 5.0% or less, and preferably 4.5% or less, when the heated drawn PET fiber is fixed under the initial load of 0.01 g/d and is kept for 24 hours under the load of 0.791 g/d and the temperature of 20° C. The PET tire cord prepared from this drawn PET fiber can show good dimensional stability even when the PET tire cord is kept under the high temperature condition and then is exposed to a sudden drop of the temperature. Thus, the PET tire cord can show good dimensional stability in the tire even when the car suddenly stops after high speed driving and increase the high speed driving performance of the tire, the controllability or the riding comport of the car.

On the other hand, the drawn PET fiber according to one embodiment of the present invention may be prepared by the method of melt-spinning the PET so as to prepare the undrawn fiber and drawing the undrawn fiber. Further, the drawn PET fiber having above mentioned properties can be prepared under the specific conditions or the specific proceeding methods of each step, that are directly or indirectly reflected to the properties of the drawn PET fiber, as disclosed above.

Particularly, it is revealed that the drawn PET fiber according to one embodiment of the present invention having the aforementioned creep rate and good dimensional stability can be prepared by obtaining the undrawn PET fiber having crystallinity of 25% or more and the AOF of 0.15 or less by controlling the conditions of melt-spinning the PET, and using the same.

Basically, The PET has partially crystallized structure and is composed of crystalline regions and amorphous regions. However, the degree of crystallization of the undrawn PET fiber obtained under the controlled melt-spinning conditions is higher than that of the former known drawn PET fiber because of the oriented crystallization phenomenon, and the crystallinity is 25% or more and preferably 25 to 40%. The drawn PET fiber and the tire cord prepared from the undrawn PET fiber can show high shrinkage stress and modulus due to such high crystallinity.

At the same time, the undrawn PET fiber shows the AOF of 0.15 or less, and preferably 0.08 to 0.15, which is largely lower than that of former known undrawn PET fiber. The AOF means that the degree of orientation of the chains included in the amorphous region of the undrawn fiber, and it has low value as the entanglement of the chains of the amorphous region increases. Generally, the drawn fiber and the tire cord prepared from the undrawn fiber having the low AOF value show low shrinkage stress as well as low shrinkage rate, because the degree of disorder increases as the AOF decreases and the chains of the amorphous region becomes not a strained structure but a relaxed structure. However, the undrawn PET fiber obtained under the controlled melt-spinning conditions includes more cross-linking bonds per a unit volume, because the molecular chains constituting the undrawn PET fiber slip during the spinning process and form a fine network structure. On this account, the undrawn PET fiber may become the structure of which the chains of the amorphous region are strained in spite of the largely lower AOF value, and thus it shows developed crystalline structure and superior orientation characteristics due to this.

Therefore, it is revealed that the drawn PET fiber and the tire cord having low shrinkage rate and high shrinkage stress at the same time can be prepared by using the undrawn PET fiber having such high crystallinity and low AOF, and moreover the drawn PET fiber and the tire cord having superior properties such as low creep rate and good dimensional stability according to one embodiment of the present invention can be prepared.

Hereinafter, the preparing method of the drawn PET fiber according to one embodiment of the present invention is explained step-by-step more in detail, as follows.

In the preparing method of the drawn PET fiber, firstly, the undrawn PET fiber having high crystallinity and low AOF disclosed above is prepared by melt-spinning the PET.

At this time, the melt-spinning process may be carried out with a higher spinning stress in order to obtain the undrawn PET fiber satisfying such crystallinity and AOF. For example, the melt-spinning process may be carried out with the spinning stress of 0.80 g/d or more, and preferably 0.85 to 1.2 g/d. Also, for example, the melt-spinning speed of the PET may be controlled to be 3800 to 5000 m/min, and preferably 4000 to 4500 m/min in order to obtain such high spinning stress As results of experiments, it is revealed that the crystallinity increases as the oriented crystallization phenomenon occurs, and the undrawn PET fiber satisfying the crystallinity and the AOF disclosed above can be obtained as the molecular chains constituting the PET slip during the spinning process and form a fine network structure, according as the melt-spinning process of the PET is carried out with the high spinning stress and selectively high spinning speed. However, it is realistically not easy to control the spinning speed to be over 5000 m/min and it is also difficult to carry out the cooling process because of the excessive spinning speed.

Furthermore, PET chips having an intrinsic viscosity of 0.8 to 1.3 and including 90 mol % or more of PET may be used in the melt-spinning as the PET in the preparing process of the undrawn PET fiber.

As disclosed above, it is possible to give the conditions of higher spinning speed and spinning stress to the preparing process of the undrawn PET fiber, and it is preferable that the intrinsic viscosity is 0.8 or more in order to carry out the spinning step preferably with the conditions. Also, it is preferable that the intrinsic viscosity is 1.3 or less in order to prevent the scission of the molecular chains due to the increase of the melting temperature of the chips and the increase of the pressure due to the extrusion amount in the spinning pack.

Furthermore, it is preferable that the chips are spun through the spinnerets designed for making linear density of a monofilament to be 2.0 to 5.0 denier, and preferably 2.0 to 3.0 denier. Namely, it is preferable that the linear density of the monofilament must be 2.0 denier or more in order to lessen the possibility of the fiber scission during the spinning and the fiber scission due to the interference of the fibers during the cooling, and it is also preferable that the linear density of the monofilament is 5.0 denier or less in order to give the sufficient spinning stress by raising the spinning draft.

Furthermore, the undrawn PET fiber may be prepared by adding a cooling process after the melt-spinning of the PET. Such cooling process may be preferably carried out according to the method of providing a cooling air of 15 to 60° C., and the cooling air flow may be preferably controlled to be 0.4 to 1.5 m/s in each temperature condition of the cooling air. With this, it is possible to prepare the drawn PET fiber showing several properties according to one embodiment of the present invention more easily.

On the other hand, the drawn fiber is prepared by drawing the undrawn fiber after preparing the undrawn PET fiber satisfying the crystallinity and the AOF disclosed above through the spinning step. At this time, the drawing process may be carried out under the condition of a drawing ratio of 1.70 or less, and preferably 1.2 to 1.6. In the undrawn PET, the crystalline region is developed, and the chains of the amorphous region also have low degree of orientation and form the fine network. Therefore, the scission of the fibers or hairiness may occur in the drawn fiber when the drawing process is carried out with the drawing ratio of over 1.70, and thus the drawn PET fiber prepared by the method is also hard to show the preferable properties according to one embodiment of the present invention due to excessive orientation of the chains of the amorphous region. Furthermore, the strength of the drawn PET fiber and the tire cord prepared therefrom may be partially lowered when the drawing process is carried out with a relatively low drawing ratio. However, it is possible to prepare the PET tire cord having the strength of 6 g/d or more, which is suitable to be applied for the cap ply cord and the like for example, under the drawing ratio of 1.0 or more, preferably 1.2 or more, and thus the drawing process may be preferably carried out with the drawing ratio of 1.0 to 1.70, and preferably 1.2 to 1.6.

The drawn PET fiber prepared by the method disclosed above may show the superior properties according to one embodiment of the present invention, that is, the superior properties such as less creep rate. Thus, it is possible to provide the tire cord having good dimensional stability by using the drawn PET fiber.

Meanwhile, according to another embodiment of the present invention, the PET tire cord including the drawn PET fiber disclosed above is provided.

Such PET tire cord may be a cord of which a creep rate defined by the following Calculation Formula 1 is 4.0% or less when the PET tire cord is fixed under the initial load of 0.01 g/d and is kept for 24 hours under the load of 0.791 g/d and the temperature of 100° C.:

$$\text{Creep rate} = (L - L0)/L0 \times 100 \quad \text{[Calculation Formula 1]}$$

wherein L is a length of the PET tire cord after keeping it for 24 hours, L0 is a length of the PET tire cord when it is fixed under the initial load.

The PET tire cord according to another embodiment of the present invention is not largely deformed in spite of the change of the load given to the tire cord itself, because the PET tire cord has the creep rate of 4.0% or less, and preferably 0 to 4.0%. Thus, the PET tire cord is not largely deformed even though the load given to the cord is suddenly increased by the change of the driving speed of the car. Therefore, the PET tire cord shows good dimensional stability and is preferably used as a cap ply cord, which strongly fixes the steel belt in a tire. By using the PET tire cord, it is also possible to increase the high speed driving performance of the tire, the controllability and the riding comport of the car.

Meanwhile, the creep rate after heating the PET tire cord for 15 min under the load of 0.01 g/d and the temperature of 180° C. may be 7.0% or less, e.g., 0 to 7.0%, when the heated PET tire cord is fixed under the initial load of 0.01 g/d and is kept for 24 hours under the load of 0.791 g/d and the temperature of 100° C. This PET tire cord can show good dimensional stability under the high temperature condition near 100° C., which is corresponding to the high speed driving condition of a tire, and can increase the high speed driving performance of the tire, the controllability or riding comport of the car.

Furthermore, the creep rate after heating the PET tire cord for 15 min under the load of 0.01 g/d and the temperature of 180° C. may be 4.0% or less, e.g., 0 to 4.0%, when the heated PET tire cord is fixed under the initial load of 0.01 g/d and is kept for 24 hours under the load of 0.791 g/d and the temperature of 20° C. This PET tire cord can show good dimensional stability even when the PET tire cord is kept under the high temperature condition and then is exposed to a sudden drop of the temperature. Thus, the PET tire cord can show good dimensional stability in the tire even when the car suddenly stops after high speed driving and increase the high speed driving performance of the tire, the controllability or the riding comport of the car.

On the other hand, the shape of the PET tire cord according to another embodiment of the present invention disclosed above is not specifically limited, and thus it may have equal shape with conventional cap ply cords. More particularly, such PET tire cord may have a shape of a dipped cord, of which the total linear density per cord is 1000 to 5000 denier (d), preferably 1500 to 3500 denier, the number of ply is 1 to 3, and the twisting level is 200 to 500 TPM (twist per meter), according to the shape of conventional cap ply cord.

Furthermore, the PET tire cord may have strength of 5 to 8 g/d, preferably 5.5 to 8 g/d, elongation (intermediate elongation at the load of 4.5 kg) of 2.0 to 5.0%, preferably 2.5 to 5.0%, elongation at break of 10 to 25%, and shrinkage rate (177° C., 30 g, 2 min) of 2.0 to 5.0%. The tire cord can be preferably applied to the cap ply cord, according as it shows the properties, such as the strength, the elongation, and the like, of the above range.

Furthermore, the PET tire cord may be applied to the pneumatic tire as the cap ply cord. The cap ply cord has superior dimensional stability and its external shape is hardly deformed, and thus the tire in which the PET tire cord is included is also not deformed easily. Therefore, the tire shows superior high speed driving performance and can improve the controllability or the riding comport of the car. Furthermore, the PET tire cord has several properties able to restrain the movement of the steel belt and suitable for the cap ply cord.

Simply, the PET tire cord according to another embodiment of the present invention disclosed above is mainly explained by supposing that the cord is used as the cap ply cord, however, the use of the PET tire cord is not limited to this and it is of course that the cord may be used for the other uses such as a body ply cord and the like.

On the other hand, the tire cord according to another embodiment of the present invention may be prepared by the method of melt-spinning the PET so as to prepare the undrawn PET fiber, drawing the undrawn PET fiber so as to prepare the drawn PET fiber, and twisting the drawn PET fibers and dipping the same in an adhesive so as to prepare a dipped cord. The PET tire cord having above mentioned properties can be prepared under the specific conditions or the specific proceeding methods of each step, that are directly or indirectly reflected to the properties of the prepared tire cord.

For example, it is revealed that the tire cord according to another embodiment of the present invention having above mentioned properties can be provided by melt-spinning the PET with the condition of higher spinning stress and selectively high spinning speed so as to prepare the undrawn PET fiber having crystallinity of 25% or more and the AOF of 0.15 or less, and preparing the drawn PET fiber and the tire cord by using the same. Therefore, the PET tire cord according to another embodiment of the present invention may be prepared by using the drawn PET fiber according to one embodiment of the present invention, for example, the drawn fiber obtained from the undrawn PET fiber having high crystallinity and low AOF.

That is, the drawn PET fiber having high shrinkage stress and low shrinkage rate together can be prepared because of the high crystallinity and the low AOF of the undrawn PET fiber, and thus the PET tire cord having superior properties such as lower creep rate, good dimensional stability, and so on can be prepared by using the same.

Therefore, the tire cord according to another embodiment of the present invention may be prepared by using the drawn PET fiber, after preparing the undrawn PET fiber having high crystallinity and low AOF and preparing the drawn PET fiber according to one embodiment of the present invention from the same. The PET tire cord is prepared into a dipped cord by twisting the drawn PET fibers and dipping the same into the adhesive, wherein the twisting process and the dipping process follow the conditions and the conventional methods of preparing PET tire cord.

The PET tire cord prepared like this may have total linear density of 1000 to 5000 denier, number of ply of 1 to 3, and twisting level of 200 to 500 TPM, and may also show superior properties disclosed above, for example, lower creep rate, good dimensional stability, and so on.

EXAMPLES

Hereinafter, the technical features and the operations of present invention are described in further detail through preferable examples. However, the following examples are only for the understanding of the present invention and the present invention is not limited to or by them.

Example 1

A PET polymer of which the intrinsic viscosity was 1.05 was used, and the undrawn fiber was prepared by melt-spinning the PET polymer under the spinning stress of 0.86 g/d and the spinning speed of 3800 m/min, and cooling the same according to conventional preparing method. And then, the drawn PET fiber of Example 1 was prepared by drawing the undrawn fiber with the drawing ratio of 1.53, and heat-setting and winding the same.

The PET tire cord of Example 1 was prepared by Z-twisting (counter-clockwise twisting) the drawn PET fibers of which the total linear density was 1000 denier with the twisting level of 430 TPM, S twisting (clockwise twisting) 2 plies of the Z twisted fibers with the same twisting level, dipping and passing the same through an resorcinol/formaldehyde/latex (RFL) adhesive solution, and drying and heat-treating the same.

The composition of the RFL adhesive solution and the conditions of the drying and the heat-setting process followed the conventional conditions for treating PET cord.

Example 2-7

The drawn PET fibers and the PET tire cords of Examples 2-7 were prepared substantially according to the same method as in Example 1, except that the conditions of the spinning speed, the spinning stress, the drawing ratio, or the intrinsic viscosity was changed in the preparing method of the drawn PET fiber as disclosed in the following Table 1.

TABLE 1

| Conditions | Example 2 | Example 3 | Example 4 | Example 5 | Example 6 | Example 7 |
|---|---|---|---|---|---|---|
| Spinning speed (m/min) | 4000 | 4500 | 4300 | 4800 | 3800 | 3800 |
| Drawing ratio | 1.46 | 1.28 | 1.36 | 1.20 | 1.53 | 1.53 |
| Spinning stress (g/d) | 0.92 | 1.15 | 1.02 | 1.18 | 0.80 | 0.90 |
| Intrinsic viscosity | 1.05 | 1.05 | 1.05 | 1.05 | 0.9 | 1.3 |

Comparative Example 1

Preparation of the Drawn PET Fiber and the PET Tire Cord by Using a Common PET Fiber The drawn PET fiber and the PET tire cord of Comparative Example 1 were prepared substantially according to the same method as in Example 1, except that the undrawn fiber was prepared by melt-spinning the PET polymer of which the intrinsic viscosity was 1.05 under the spinning stress of 0.06 g/d and the spinning speed of 800 m/min, and the drawn PET fiber was prepared by drawing the undrawn fiber with the drawing ratio of 6.0.

Comparative Example 2

Preparation of the Drawn PET Fiber and the PET Tire Cord by Using a HMLS Fiber

The drawn PET fiber an the PET tire cord of Comparative Example 2 were prepared substantially according to the same method as in Example 1, except that the undrawn fiber was prepared by melt-spinning the PET polymer of which the intrinsic viscosity was 1.05 under the spinning stress of 0.52 g/d and the spinning speed of 3000 m/min and the drawn fiber was prepared by drawing the undrawn fiber with the drawing ratio of 1.8.

Comparative Example 3

Preparation of the Drawn Fiber and the Tire Cord by Using a Nylon 66 Fiber

The undrawn fiber was prepared by melt-spinning the nylon 66 polymer of which the relative viscosity was 3.3 with the spinning stress of 0.15 g/d and the spinning speed of 600 m/min and cooling, and then the drawn fiber of Comparative Example 3 was prepared by drawing the undrawn fiber with the drawing ratio of 5.5, and heat-setting and winding.

The tire cord of Comparative Example 3 was prepared by Z-twisting the drawn PET fibers of which the total linear densities were 840 denier and 1000 denier with the twisting levels of 310 TPM and 430 TPM, respectively, S twisting 2 plies of the Z twisted fibers with the same twisting level, dipping and passing the same through the RFL adhesive solution, and drying and heat-treating the same.

The composition of the RFL adhesive solution and the conditions of the drying and the heat-setting process followed the conventional conditions for treating nylon 66 cord.

Firstly, the crystallinity and the AOF of the undrawn PET fibers obtained in Examples 1 to 7 and Comparative Examples 1 and 2 were measured according to the following method, and the measured results are listed in the following Table 2:

Crystallinity: the density was measured after preparing a density gradient tube by using $CCl_4$ and n-heptane, and the crystallinity was calculated from the measured density by using the following calculation formula:

$$PET\ Crystallinity\ (\%) = Xc\ (\%) = \left[\frac{\rho - \rho_a}{\rho_c - \rho_a}\right] \times 100$$

wherein, $\rho_a$=1.336, and $\rho_c$=1.457 in case of the PET.

Amorphous orientation factor (AOF): the AOF was calculated according to the following formula by using the birefringence index measured by using a polarized micrometer and the crystal orientation factor (COF) measured by X-ray diffraction (XRD):

AOF=(birefringence index−
crystallinity(%)*0.01*COF*0.275)/
((1−crystallinity(%)*0.01)*0.22).

TABLE 2

|  | Example 1 | Example 2 | Example 3 | Example 4 | Example 5 | Example 6 | Example 7 | Com. Example 1 | Com. Example 2 |
|---|---|---|---|---|---|---|---|---|---|
| Crystallinity (%) | 28 | 30 | 36 | 30 | 38 | 26 | 28 | 2 | 9 |
| AOF | 0.120 | 0.093 | 0.009 | 0.050 | 0.002 | 0.116 | 0.121 | 0.005 | 0.245 |

* Com. Example is Comparative Example

Subsequently, the creep rate was measured with regard to the drawn fibers and the tire cords prepared in Examples 1 to 7 and Comparative Examples 1 to 3, according to the following method.

Figure 2:
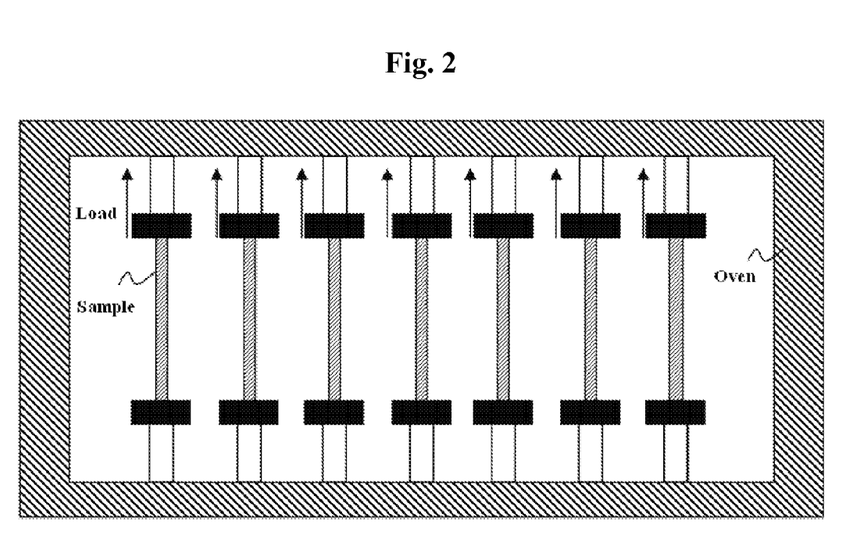
FIG. 2 is a schematic drawing of a creep tester used for measuring a creep rate.

The creep tester (manufactured by Toyoseiki Co.) illustrated in FIG. 2 was used for measuring the creep rate. The drawn fibers and the tire cords prepared in Examples 1 to 7 and Comparative Examples 1 to 3 were fixed under the initial load of 0.01 g/d using the creep tester (initial length L0=195 mm when fixing under the initial load). Subsequently, the drawn fibers and the tire cords were kept for 24 hours under the load of 0.791 g/d and the temperature of 100° C. After keeping them for 24 hours, the length L of the drawn fibers and the tire cords of Examples 1 to 7 and Comparative Examples 1 to 3 were measured and the creep rate of the respective drawn fibers and tire cords was calculated from the measured lengths of L and L0 according to the Calculation Formula 1. The calculated results of the creep rate are listed in the following Tables 3 and 4.

TABLE 3

|  | Example 1 | Example 2 | Example 3 | Example 4 | Example 5 |
|---|---|---|---|---|---|
| Creep rate of the drawn fiber (%) @ 100° C. | 5.0 | 4.8 | 4.4 | 4.6 | 4.1 |
| Creep rate of the tire cord (%) @ 100° C. | 3.5 | 3.7 | 3.7 | 3.5 | 3.3 |

TABLE 4

|  | Example 6 | Example 7 | Comparative Example 1 | Comparative Example 2 | Comparative Example 3 |
|---|---|---|---|---|---|
| Creep rate of the drawn fiber (%) @ 100° C. | 5.4 | 5.0 | 6.5 | 6.0 | 7.2 |
| Creep rate of the tire cord (%) @ 100° C. | 3.9 | 3.7 | 4.9 | 4.1 | 6.1 |

Subsequently, the creep rate of the drawn fibers and the tire cords prepared in Examples 1 to 7 and Comparative Examples 1 to 3 was measured at 20° C. and 100° C. by the same method as described above, after heating the respective drawn fibers and tire cords for 15 min under the load of 0.01 g/d and the temperature of 180° C. (initial length L0=195 mm).

That is, the heated drawn fibers and tire cords were fixed under the initial load of 0.01 g/d, and then were kept for 24 hours under the load of 0.791 g/d and the temperature of 100° C. After keeping them for 24 hours, the length L of the drawn fibers and the tire cords of Examples 1 to 7 and Comparative Examples 1 to 3 were measured and the creep rate of the respective drawn fibers and tire cords were calculated from the measured length of L and L0 according to the Calculation Formula 1 (measurement of the creep rate at 100° C.).

In addition, the heated drawn fibers and tire cords were fixed under the initial load of 0.01 g/d, and then were kept for 24 hours under the load of 0.791 g/d and the temperature of 20° C. After keeping them for 24 hours, the length L of the drawn fibers and the tire cords of Examples 1 to 7 and Comparative Examples 1 to 3 were measured and the creep rate of the respective drawn fibers and tire cords were calculated from the measured length of L and L0 according to the Calculation Formula 1 (measurement of the creep rate at 20° C.).

The calculated results of the creep rate at 20° C. and 100° C. are listed in the following Tables 5 and 6.

TABLE 5

|  | Example 1 | Example 2 | Example 3 | Example 4 | Example 5 |
|---|---|---|---|---|---|
| Creep rate of the drawn fiber (%) @ 20° C. | 4.5 | 4.3 | 4.2 | 4.2 | 4.0 |
| Creep rate of the tire cord (%) @ 20° C. | 3.7 | 3.7 | 3.5 | 3.6 | 3.3 |
| Creep rate of the drawn fiber (%) @ 100° C. | 7.0 | 6.8 | 6.4 | 6.6 | 6.0 |
| Creep rate of the tire cord (%) @ 100° C. | 6.5 | 6.5 | 5.8 | 6.1 | 5.6 |

TABLE 6

|  | Example 6 | Example 7 | Comparative Example 1 | Comparative Example 2 | Comparative Example 3 |
|---|---|---|---|---|---|
| Creep rate of the drawn fiber (%) @ 20° C. | 4.7 | 4.4 | 5.4 | 5.3 | 6.4 |
| Creep rate of the tire cord (%) @ 20° C. | 3.8 | 3.7 | 4.3 | 4.1 | 5.8 |
| Creep rate of the drawn fiber (%) @ 100° C. | 7.2 | 6.9 | 9.2 | 9.0 | 8.0 |
| Creep rate of the tire cord (%) @ 100° C. | 6.7 | 6.3 | 8.4 | 9.2 | 7.6 |

Referring to Tables 3 to 6, it is recognized that the drawn fibers and the tire cords of Examples 1 to 7 prepared from the undrawn PET fibers having high crystallinity and low AOF show remarkably lower creep rate comparing to them of Comparative Examples 1 to 3, especially even after heating them at 180° C. corresponding to the high speed driving condition of a tire.

Comparing to Examples 1 to 7, the PET drawn fiber and the tire cord of Comparative Example 1 show high creep rate.

Further, after heating them at 180° C., they show higher creep rate under the high temperature condition.

In addition, The Nylon 66 drawn fiber and the tire cord of Comparative Example 3 also show comparatively high creep rate under the high temperature condition.

Further, The HMLS drawn fiber and the tire cord of Comparative Example 2 also show comparatively high creep rate, especially after heating them, even though they show lower creep rate than those of Comparative Examples 1 & 3.

Accordingly, the drawn fibers and the tire cords of Examples 1 to 7 are not easily deformed, especially after heating them corresponding to high speed driving condition of tire. Further, the drawn fibers and the tire cords are not easily deformed either, even when they are suddenly cooled after heating, which is corresponding to the condition of sudden stop after high speed driving of tire.

Meanwhile, properties of the tire cords of Examples 1 to 7 and Comparative Examples 1 to 3 were measured according to the following methods. The measured results are listed in the following Table 7.

Shrinkage rate: the shrinkage rate of the respective tire cords was measured for 2 min under the initial tension of 30 g and the temperature of 180° C. using TestRite MK-V tester of TestRite Co.

LASE value at 3% elongation: according to ASTM D885, LASE value at 3% elongation (the load at 3% elongation) was measured using universal testing machine for the tensile test. Also, L/S value was calculated from the measured LASE value according to the following formula.

$L/S = LASE/Shrinkage\ rate(\%)$

TABLE 7

Properties of the tire cords

|  | L/S(g/d) | LASE at 3% elongation (g/d) |
|---|---|---|
| Example 1 | 71 | 1.95 |
| Example 2 | 70 | 1.90 |
| Example 3 | 94 | 2.10 |
| Example 4 | 82 | 2.01 |
| Example 5 | 103 | 2.23 |
| Example 6 | 77 | 1.98 |
| Example 7 | 70 | 1.92 |
| Comparative Example 1 | 30 | 1.51 |
| Comparative Example 2 | 55 | 1.30 |
| Comparative Example 3 | 10 | 0.72 |

Referring to Table 7, it is recognized that the tire cords of Examples 1 to 7 have comparatively low shrinkage rate and high LASE and L/S, and thus show superior dimensional stability. Comparing to Examples 1 to 7, the tire cords of Comparative Examples 1 to 3 show lower dimensional stability.

Accordingly, it is confirmed that the tire cords of Examples 1 to 7 show good dimensional stability and also improve the high speed driving performance of the tire, the controllability or the riding comport of the car as cap ply cords.

What is claimed is:

1. A drawn polyethylene terephthalate (PET) fiber, including 90 mol % or more of PET, wherein a creep rate defined by the following Calculation Formula 1 is 5.5% or less when the drawn PET fiber is fixed under the initial load of 0.01 g/d and is kept for 24 hours under the load of 0.791 g/d and the temperature of 100° C.:

$Creep\ rate = (L-L0)/L0 \times 100$   Calculation Formula 1 wherein L is a length of the drawn PET fiber after keeping it for 24 hours, L0 is a length of the drawn PET fiber when it is fixed under the initial load, wherein the drawn PET fiber is obtained by drawing an undrawn PET fiber at a draw ratio of 1.0 to 1.70, and wherein the undrawn PET fiber has an amorphous orientation factor (AOF) of 0.15 or less.

2. The drawn PET fiber according to claim 1, wherein the creep rate after heating the drawn PET fiber for 15 min under the load of 0.01 g/d and the temperature of 180° C. is 7.5% or less when the heated drawn PET fiber is fixed under the initial load of 0.01 g/d and is kept for 24 hours under the load of 0.791 g/d and the temperature of 100° C.

3. The drawn PET fiber according to claim 1, wherein the creep rate after heating the drawn PET fiber for 15 min under the load of 0.01 g/d and the temperature of 180° C. is 5.0% or less when the heated drawn PET fiber is fixed under the initial load of 0.01 g/d and is kept for 24 hours under the load of 0.791 g/d and the temperature of 20° C.

4. A polyethylene terephthalate tire cord including the drawn polyethylene terephthalate fiber according to claim 1.

5. A polyethylene terephthalate (PET) tire cord, wherein a creep rate defined by the following Calculation Formula 1 is 4.0% or less when the PET tire cord is fixed under the initial load of 0.01 g/d and is kept for 24 hours under the load of 0.791 g/d and the temperature of 100° C.:

$Creep\ rate = (L-L0)/L0 \times 100$   Calculation Formula 1 wherein L is a length of the PET tire cord after keeping it for 24 hours, L0 is a length of the PET tire cord when it is fixed under the initial load, wherein the PET tire cord is made from a drawn PET fiber that includes 90 mol % or more of PET, wherein a creep rate of the drawn PET fiber defined by the above Calculation Formula 1 is 5.5% or less when the drawn PET fiber is fixed under the initial load of 0.01 g/d and is kept for 24 hours under the load of 0.791 g/d and the temperature of 100° C., wherein the drawn PET fiber is obtained by drawing an undrawn PET at a draw ratio of 1.0 to 1.70, and wherein the undrawn PET has an amorphous orientation factor (AOF) of 0.15 or less.

6. The PET tire cord according to claim 5, wherein the creep rate after heating the PET tire cord for 15 min under the load of 0.01 g/d and the temperature of 180° C. is 7.0% or less when the heated PET tire cord is fixed under the initial load of 0.01 g/d and is kept for 24 hours under the load of 0.791 g/d and the temperature of 100° C.

7. The PET tire cord according to claim 5, wherein the creep rate after heating the PET tire cord for 15 min under the load of 0.01 g/d and the temperature of 180° C. is 4.0% or less when the heated PET tire cord is fixed under the initial load of 0.01 g/d and is kept for 24 hours under the load of 0.791 g/d and the temperature of 20° C.

8. The PET tire cord according to claim 4, having strength of 5 to 8 g/d, intermediate elongation (@4.5 kg) of 2.0 to 5.0%, elongation at break of 10 to 25%, and shrinkage rate (177° C., 30 g, 2 min) of 2.0 to 5.0%.

9. The PET tire cord according to claim 4, having total linear density of 1000 to 5000 denier, number of ply of 1 to 3, and twisting level of 200 to 500 TPM.

10. The PET tire cord according to claim 4, wherein the tire cord is a cap ply cord.

11. A pneumatic tire including the tire cord according to Claim 4.

12. The pneumatic tire according to claim 11, wherein the tire cord is applied to a cap ply cord.

13. A polyethylene terephthalate tire cord including the drawn polyethylene terephthalate fiber according to claim 2.

14. A polyethylene terephthalate tire cord including the drawn polyethlene terephthalate fiber according to claim 3.

15. The PET tire cord according to claim 5, having strength of 5 to 8 g/d, intermediate elongation (@4.5 kg) of 2.0 to 5.0%, elongation at break of 10 to 25%, and shrinkage rate (177 oC, 30 g, 2 min) of 2.0 to 5.0%.

16. The PET tire cord according to claim 5, having total linear density of 1000 to 5000 denier, number of ply of 1 to 3, and twisting level of 200 to 500 TPM.

17. The PET tire cord according to claim 5, wherein the tire cord is a cap ply cord.

18. A pneumatic tire including the tire cord according to claim 5.

* * * * *